United States Patent
Schwent et al.

(10) Patent No.: US 8,750,411 B2
(45) Date of Patent: Jun. 10, 2014

(54) METHOD AND APPARATUS FOR REDUCING TRANSMITTER INTERFERENCE

(75) Inventors: Dale G. Schwent, Schaumburg, IL (US); Gregory W. Chance, Mundelein, IL (US); Thomas D. Nagode, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 515 days.

(21) Appl. No.: 13/172,918

(22) Filed: Jun. 30, 2011

(65) Prior Publication Data
US 2013/0003890 A1    Jan. 3, 2013

(51) Int. Cl.
H04L 25/03 (2006.01)
H04L 27/20 (2006.01)
H04L 27/36 (2006.01)
H04L 27/26 (2006.01)

(52) U.S. Cl.
CPC .......... H04L 27/2691 (2013.01); H04L 27/362 (2013.01); H04L 27/2657 (2013.01); H04L 27/2626 (2013.01)
USPC ............................ 375/296; 375/279; 375/308

(58) Field of Classification Search
CPC ...... H04B 1/0475; H04B 15/06; H04L 27/20; H04L 27/2627; H04L 27/362; H03D 7/18
USPC ......... 375/259, 260, 271, 279, 295, 302, 308, 375/296
See application file for complete search history.

(56) References Cited

U.S. PATENT DOCUMENTS

| 6,785,527 | B2* | 8/2004 | Earls ............................. 455/323 |
| 7,471,934 | B2* | 12/2008 | Shi et al. .................... 455/114.2 |
| 7,827,430 | B2 | 11/2010 | Behzad et al. |
| 2006/0209971 | A9 | 9/2006 | Jia et al. |
| 2008/0025380 | A1 | 1/2008 | Behzad et al. |
| 2008/0045152 | A1 | 2/2008 | Boes |
| 2009/0209222 | A1* | 8/2009 | Li et al. ......................... 455/323 |
| 2010/0177850 | A1* | 7/2010 | Iizuka ........................... 375/316 |
| 2013/0266093 | A1* | 10/2013 | Lindoff et al. ................ 375/340 |

FOREIGN PATENT DOCUMENTS

| EP | 1233508 A2 | 8/2002 |
| EP | 1061689 B1 | 1/2007 |

OTHER PUBLICATIONS

Patent Cooperation Treaty, International Search Report and Written Opinion of the International Searching Authority for International Application No. PCT/US2012/043059, Sep. 7, 2012, 11 pages.

* cited by examiner

*Primary Examiner* — David B. Lugo (57) ABSTRACT

A method and apparatus mitigates spurious transmissions. An offset local oscillator signal is generated that is at a frequency that is offset from a nominal transmit channel carrier frequency by a spurious mitigation offset. An information signal is generated that comprises a series of modulation symbols and has a transmission bandwidth at baseband. A configured offset information signal is generated from the information signal, wherein the spectrum of the configured offset information signal is offset from DC by a channel configuration offset, and is further offset by a negative of the spurious mitigation offset. The offset local oscillator signal and the configured offset information signal are combined using a mixing technique. The spurious mitigation offset is zero when a spurious condition does not exist and is non-zero when the spurious condition does exist.

20 Claims, 7 Drawing Sheets

| Resource Block (RB) Index | f_N Lower Edge (MHz) | f_N Upper Edge (MHz) | CIM Lower Edge (MHz) | CIM Upper Edge (MHz) | IMM Lower Edge (MHz) | IMM Upper Edge (MHz) |
|---|---|---|---|---|---|---|
| 0 | -4.50 | -4.32 | 794.96 | 795.50 | 768.50 | 769.04 |
| 1 | -4.32 | -4.14 | 794.42 | 794.96 | 769.04 | 769.58 |
| 2 | -4.14 | -3.96 | 793.88 | 794.42 | 769.58 | 770.12 |
| 3 | -3.96 | -3.78 | 793.34 | 793.88 | 770.12 | 770.66 |
| 4 | -3.78 | -3.60 | 792.80 | 793.34 | 770.66 | 771.20 |
| 5 | -3.60 | -3.42 | 792.26 | 792.80 | 771.20 | 771.74 |
| 6 | -3.42 | -3.24 | 791.72 | 792.26 | 771.74 | 772.28 |
| 7 | -3.24 | -3.06 | 791.18 | 791.72 | 772.28 | 772.82 |
| 8 | -3.06 | -2.88 | 790.64 | 791.18 | 772.82 | 773.36 |
| 9 | -2.88 | -2.70 | 790.10 | 790.64 | 773.36 | 773.90 |
| 10 | -2.70 | -2.52 | 789.56 | 790.10 | 773.90 | 774.44 |
| 11 | -2.52 | -2.34 | 789.02 | 789.56 | 774.44 | 774.98 |
| 12 | -2.34 | -2.16 | 788.48 | 789.02 | 774.98 | 775.52 |
| 13 | -2.16 | -1.98 | 787.94 | 788.48 | 775.52 | 776.06 |
| 14 | -1.98 | -1.80 | 787.40 | 787.94 | 776.06 | 776.60 |
| 15 | -1.80 | -1.62 | 786.86 | 787.40 | 776.60 | 777.14 |
| 16 | -1.62 | -1.44 | 786.32 | 786.86 | 777.14 | 777.68 |
| 17 | -1.44 | -1.26 | 785.78 | 786.32 | 777.68 | 778.22 |
| 18 | -1.26 | -1.08 | 785.24 | 785.78 | 778.22 | 778.76 |
| 19 | -1.08 | -0.90 | 784.70 | 785.24 | 778.76 | 779.30 |
| 20 | -0.90 | -0.72 | 784.16 | 784.70 | 779.30 | 779.84 |
| 21 | -0.72 | -0.54 | 783.62 | 784.16 | 779.84 | 780.38 |
| 22 | -0.54 | -0.36 | 783.08 | 783.62 | 780.38 | 780.92 |
| 23 | -0.36 | -0.18 | 782.54 | 783.08 | 780.92 | 781.46 |
| 24 | -0.18 | 0.00 | 782.00 | 782.54 | 781.46 | 782.00 |
| 25 | 0.00 | 0.18 | 781.46 | 782.00 | 782.00 | 782.54 |
| 26 | 0.18 | 0.36 | 780.92 | 781.46 | 782.54 | 783.08 |
| 27 | 0.36 | 0.54 | 780.38 | 780.92 | 783.08 | 783.62 |
| 28 | 0.54 | 0.72 | 779.84 | 780.38 | 783.62 | 784.16 |
| 29 | 0.72 | 0.90 | 779.30 | 779.84 | 784.16 | 784.70 |
| 30 | 0.90 | 1.08 | 778.76 | 779.30 | 784.70 | 785.24 |
| 31 | 1.08 | 1.26 | 778.22 | 778.76 | 785.24 | 785.78 |
| 32 | 1.26 | 1.44 | 777.68 | 778.22 | 785.78 | 786.32 |
| 33 | 1.44 | 1.62 | 777.14 | 777.68 | 786.32 | 786.86 |
| 34 | 1.62 | 1.80 | 776.60 | 777.14 | 786.86 | 787.40 |
| 35 | 1.80 | 1.98 | 776.06 | 776.60 | 787.40 | 787.94 |
| 36 | 1.98 | 2.16 | 775.52 | 776.06 | 787.94 | 788.48 |
| 37 | 2.16 | 2.34 | 774.98 | 775.52 | 788.48 | 789.02 |
| 38 | 2.34 | 2.52 | 774.44 | 774.98 | 789.02 | 789.56 |
| 39 | 2.52 | 2.70 | 773.90 | 774.44 | 789.56 | 790.10 |
| 40 | 2.70 | 2.88 | 773.36 | 773.90 | 790.10 | 790.64 |
| 41 | 2.88 | 3.06 | 772.82 | 773.36 | 790.64 | 791.18 |
| 42 | 3.06 | 3.24 | 772.28 | 772.82 | 791.18 | 791.72 |
| 43 | 3.24 | 3.42 | 771.74 | 772.28 | 791.72 | 792.26 |
| 44 | 3.42 | 3.60 | 771.20 | 771.74 | 792.26 | 792.80 |
| 45 | 3.60 | 3.78 | 770.66 | 771.20 | 792.80 | 793.34 |
| 46 | 3.78 | 3.96 | 770.12 | 770.66 | 793.34 | 793.88 |
| 47 | 3.96 | 4.14 | 769.58 | 770.12 | 793.88 | 794.42 |
| 48 | 4.14 | 4.32 | 769.04 | 769.58 | 794.42 | 794.96 |
| 49 | 4.32 | 4.50 | 768.50 | 769.04 | 794.96 | 795.50 |

| Resource Block (RB) Index | $f_{ul}$-$f_{offset}$ Lower Edge (MHz) | $f_{ul}$-$f_{offset}$ Upper Edge (MHz) | CIM Lower Edge (MHz) | CIM Upper Edge (MHz) | IIM Lower Edge (MHz) | IIM Upper Edge (MHz) |
|---|---|---|---|---|---|---|
| 0 | -6.20 | -6.02 | 801.76 | 802.30 | 765.10 | 765.64 |
| 1 | -6.02 | -5.84 | 801.22 | 801.76 | 765.64 | 766.18 |
| 2 | -5.84 | -5.66 | 800.68 | 801.22 | 766.18 | 766.72 |
| 3 | -5.66 | -5.48 | 800.14 | 800.68 | 766.72 | 767.26 |
| 4 | -5.48 | -5.30 | 799.60 | 800.14 | 767.26 | 767.80 |
| 5 | -5.30 | -5.12 | 799.06 | 799.60 | 767.80 | 768.34 |
| 6 | -5.12 | -4.94 | 798.52 | 799.06 | 768.34 | 768.88 |
| 7 | -4.94 | -4.76 | 797.98 | 798.52 | 768.88 | 769.42 |
| 8 | -4.76 | -4.58 | 797.44 | 797.98 | 769.42 | 769.96 |
| 9 | -4.58 | -4.40 | 796.90 | 797.44 | 769.96 | 770.5 |
| 10 | -4.40 | -4.22 | 796.36 | 796.90 | 770.5 | 771.04 |
| 11 | -4.22 | -4.04 | 795.82 | 796.36 | 771.04 | 771.58 |
| 12 | -4.04 | -3.86 | 795.28 | 795.82 | 771.58 | 772.12 |
| 13 | -3.86 | -3.68 | 794.74 | 795.28 | 772.12 | 772.66 |
| 14 | -3.68 | -3.50 | 794.20 | 794.74 | 772.66 | 773.2 |
| 15 | -3.50 | -3.32 | 793.66 | 794.20 | 773.2 | 773.74 |
| 16 | -3.32 | -3.14 | 793.12 | 793.66 | 773.74 | 774.28 |
| 17 | -3.14 | -2.96 | 792.58 | 793.12 | 774.28 | 774.82 |
| 18 | -2.96 | -2.78 | 792.04 | 792.58 | 774.82 | 775.36 |
| 19 | -2.78 | -2.60 | 791.50 | 792.04 | 775.36 | 775.90 |
| 20 | -2.60 | -2.42 | 790.96 | 791.50 | 775.90 | 776.44 |
| 21 | -2.42 | -2.24 | 790.42 | 790.96 | 776.44 | 776.98 |
| 22 | -2.24 | -2.06 | 789.88 | 790.42 | 776.98 | 777.52 |
| 23 | -2.06 | -1.88 | 789.34 | 789.88 | 777.52 | 778.06 |
| 24 | -1.88 | -1.70 | 788.80 | 789.34 | 778.06 | 778.60 |
| 25 | -1.70 | -1.52 | 788.26 | 788.80 | 778.60 | 779.14 |
| 26 | -1.52 | -1.34 | 787.72 | 788.26 | 779.14 | 779.68 |
| 27 | -1.34 | -1.16 | 787.18 | 787.72 | 779.68 | 780.22 |
| 28 | -1.16 | -0.98 | 786.64 | 787.18 | 780.22 | 780.76 |
| 29 | -0.98 | -0.80 | 786.10 | 786.64 | 780.76 | 781.30 |
| 30 | -0.80 | -0.62 | 785.56 | 786.10 | 781.30 | 781.84 |
| 31 | -0.62 | -0.44 | 785.02 | 785.56 | 781.84 | 782.38 |
| 32 | -0.44 | -0.26 | 784.48 | 785.02 | 782.38 | 782.92 |
| 33 | -0.26 | -0.08 | 783.94 | 784.48 | 782.92 | 783.46 |
| 34 | -0.08 | 0.10 | 783.40 | 783.94 | 783.46 | 784.00 |
| 35 | 0.10 | 0.28 | 782.86 | 783.40 | 784.00 | 784.54 |
| 36 | 0.28 | 0.46 | 782.32 | 782.86 | 784.54 | 785.08 |
| 37 | 0.46 | 0.64 | 781.78 | 782.32 | 785.08 | 785.62 |
| 38 | 0.64 | 0.82 | 781.24 | 781.78 | 785.62 | 786.16 |
| 39 | 0.82 | 1.00 | 780.70 | 781.24 | 786.16 | 786.70 |
| 40 | 1.00 | 1.18 | 780.16 | 780.70 | 786.70 | 787.24 |
| 41 | 1.18 | 1.36 | 779.62 | 780.16 | 787.24 | 787.78 |
| 42 | 1.36 | 1.54 | 779.08 | 779.62 | 787.78 | 788.32 |
| 43 | 1.54 | 1.72 | 778.54 | 779.08 | 788.32 | 788.86 |
| 44 | 1.72 | 1.90 | 778.00 | 778.54 | 788.86 | 789.40 |
| 45 | 1.90 | 2.08 | 777.46 | 778.00 | 789.40 | 789.94 |
| 46 | 2.08 | 2.26 | 776.92 | 777.46 | 789.94 | 790.48 |
| 47 | 2.26 | 2.44 | 776.38 | 776.92 | 790.48 | 791.02 |
| 48 | 2.44 | 2.62 | 775.84 | 776.38 | 791.02 | 791.56 |
| 49 | 2.62 | 2.80 | 775.30 | 775.84 | 791.56 | 792.10 |

1106
USE A STORED LOCAL OSCILLATOR TUNING STATE AND A STORED DIVIDER STATE TO TUNE THE LOCAL OSCILLATOR TO A NEW RF TRANSMIT FREQUENCY WHEN A CHANGE OF SPURIOUS MITIGATION OFFSETS OCCURS BETWEEN SEQUENTIAL TRANSMISSIONS FROM A DEVICE

FIG. 11

METHOD AND APPARATUS FOR REDUCING TRANSMITTER INTERFERENCE

FIELD OF THE DISCLOSURE

The present disclosure relates generally to radio transmission and more particularly to reducing transmitted interference of the intermodulation type.

BACKGROUND

When a desired transmitted radio signal is generated using a non-linear combining of signals (such as by mixing a signal from a local oscillator operating at a channel frequency and a baseband information signal) and/or non-linear amplification of signals, signals at undesired frequencies may also be generated, which are generally referred to as spurious signals, or more simply, spurs. Types of spurs include intermodulation spurs (IM spurs) and image spurs. One type of IM spur that can be generated is referred to as counter IM, which is characterized as having energy at and around a frequency of $f_{LO}-3f_M$, where $f_{LO}$ is the carrier frequency of the desired signal and $f_M$ is the center of the modulated baseband signal. Another type of IM spur is characterized as having energy at and around a frequency of $f_{LO}+3f_M$ and is produced through mixing of the desired signal $f_{LO}+f_M$ and the image spur $f_{LO}-f_M$. This is referred to as image induced intermodulation (IIIM) in this document.

In some cases, the spurs fall within another assigned channel and exceed desired or approved energy levels. A known method of mitigating this problem is to reduce the transmitted power, but this reduces the range of the desired signal.

An interference problem can arise in some devices which have a processor clock. The processor clock circuitry typically involves an oscillator and square wave generating circuits. The processor clock circuitry can produce radiated energy at harmonics of the frequency of the oscillator or square wave. These harmonics can introduce undesired signals when the device transmits a desired signal. The undesired signal (spurious signal) may have enough energy at a particular channel frequency used by other devices to cause interference with a desired signal that is being transmitted to the other devices. In some designs, the frequency of the oscillator is offset to change the frequency of the undesired signal so that it is no longer on the particular channel frequency.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 4 and 5 are tables of the upper and lower frequency limits of each resource block, and the associated CIM and image spurious frequencies for Band 13 when no spurious mitigation offset is used (FIG. 4) and when a spurious mitigation offset is used (FIG. 5), in accordance with some LTE 3GPP embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with certain embodiments, a method and apparatus mitigates spurious transmissions. An offset local oscillator signal is generated that is at a frequency that is offset from a nominal transmit channel carrier frequency by a spurious mitigation offset. An information signal is generated that comprises a series of modulation symbols and has a transmission bandwidth at baseband. A configured offset information signal is generated from the information signal, wherein the spectrum of the configured offset information signal is offset from DC by a channel configuration offset, and is further offset by a negative of the spurious mitigation offset. The offset local oscillator signal and the configured offset information signal are combined using a mixing technique. The spurious mitigation offset is zero when a spurious condition does not exist and is non-zero when the spurious condition does exist.

Figures 1, 3:
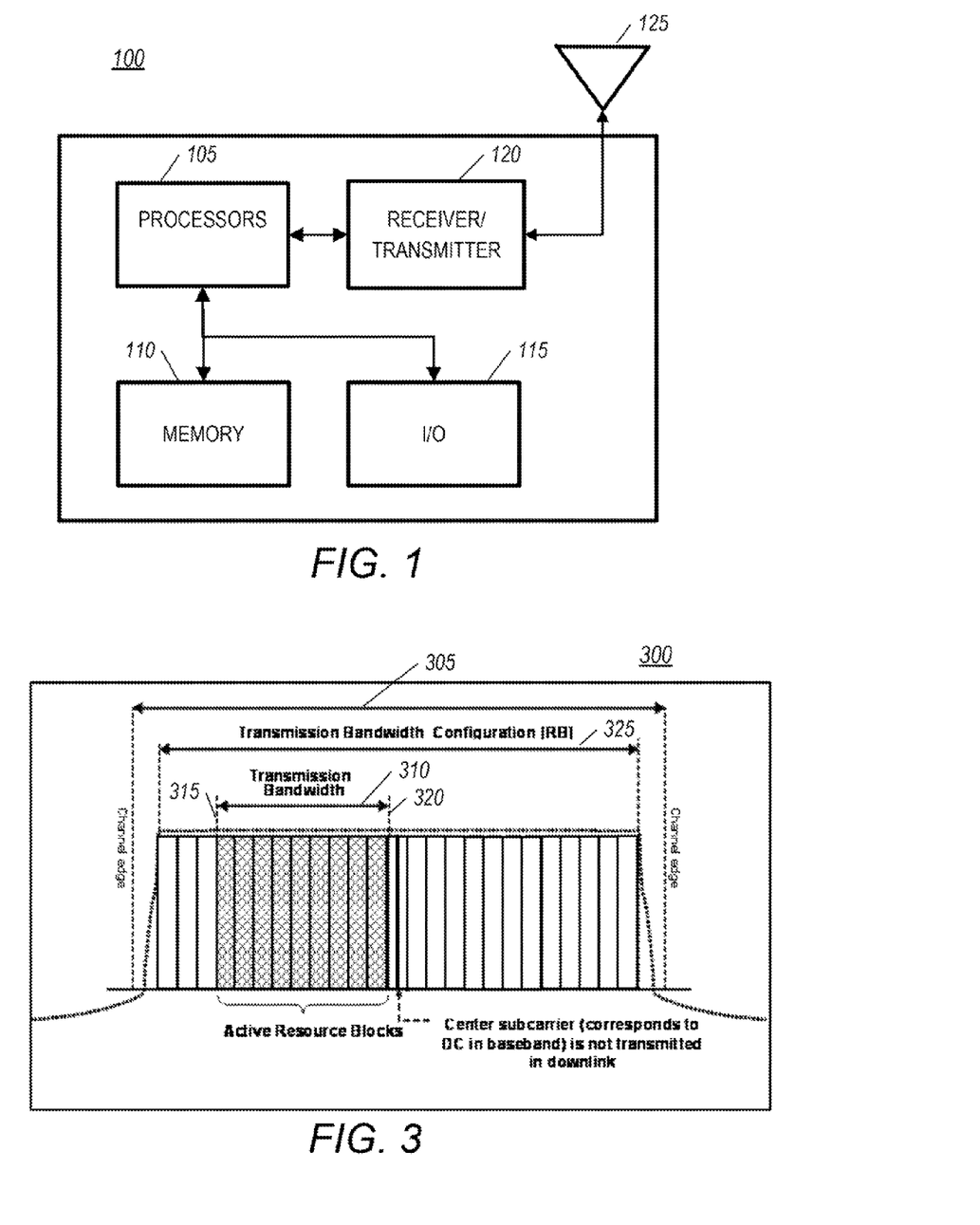
FIG. 1 is a block diagram of a device that includes a transmitter, in accordance with certain embodiments.
FIG. 3 is a spectral diagram of an RF channel in a 3GPP system, in accordance with some embodiments.

FIG. 1 is a block diagram of a device 100 that includes a transmitter, in accordance with certain embodiments. The device 100 includes one or more processors 105, each of which may include such sub-functions as central processing units, cache memory, instruction decoders, just to name a few. The processors execute program instructions which could be located within the processors in the form of programmable read only memory, or may located in a memory 110 to which the processors 105 are bi-directionally coupled. The processors may include input/output interface circuitry and may be coupled to separate input/output interface circuitry 115. The processors 105 are further coupled to at least a radio transmit function, although in many embodiments, the processors 105 are coupled to a radio receive-transmit function 120 that is itself is coupled to a radio antenna 125. In some embodiments, the processors 105 may be coupled to the receive-transmit function 120 through the input/output function 115. The receive/transmit function 120 may comprise one or more processors and memory, in addition to circuits that are unique to radio functionality. The device 100 may be a personal communication device such as a cell phone, a tablet, or a personal computer, or may be any other type of radio transmitter operating in a radio network. In some embodiments, the device 100 is an LTE (Long Term Evolution) UE (user equipment that operates in a 3GPP ($3^{rd}$ Generation Partnership Project) network.

Figure 2:
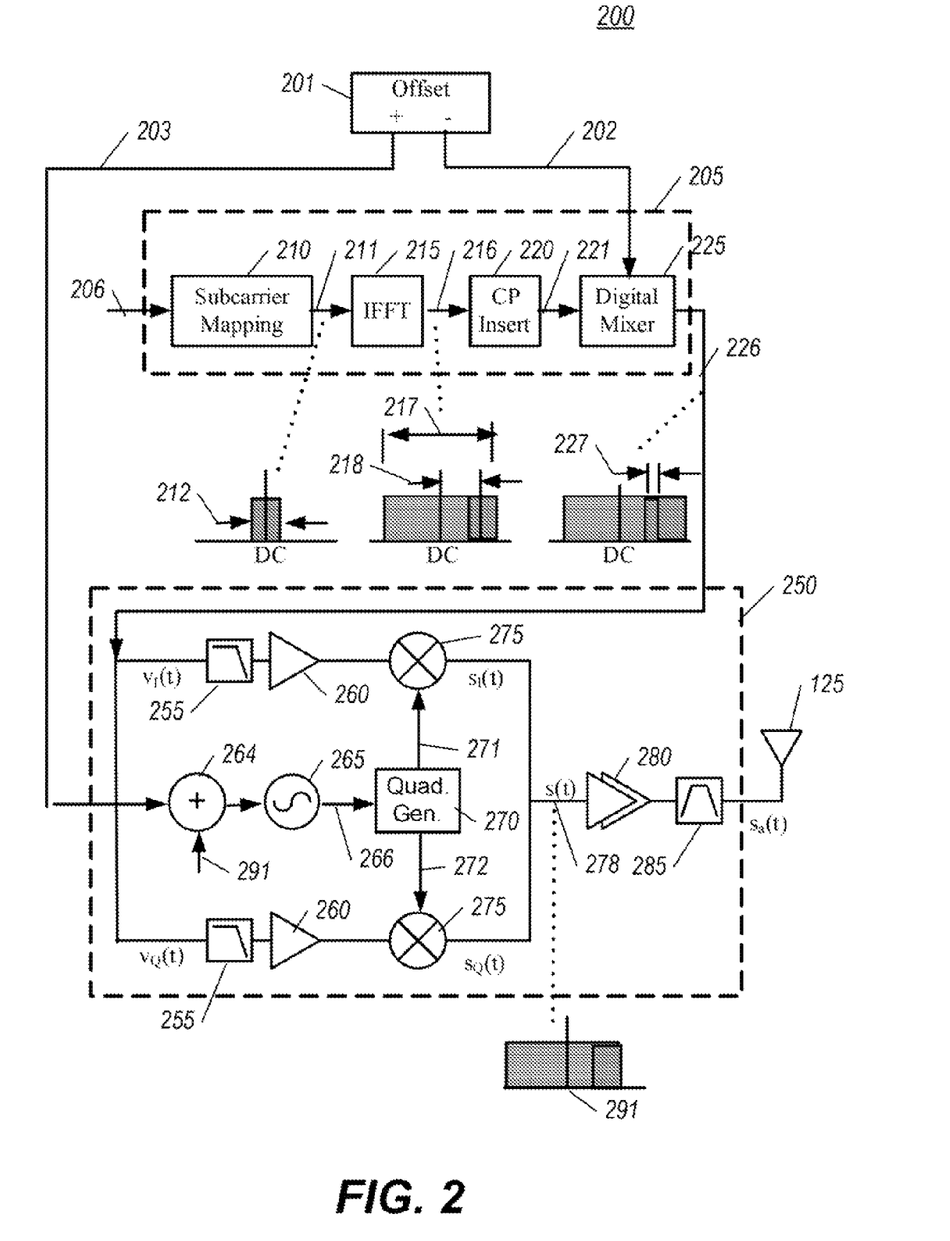
FIG. 2 is a block diagram of parts of the transmitter of the receiver/transmitter of FIG. 1, in accordance with certain embodiments.

Referring to FIG. 2, a block diagram of parts of a transmitter 200 of the receiver/transmitter 120 of FIG. 1 is shown, in accordance with certain embodiments. The transmitter 200 uses a direct conversion transmitter technique. The transmitter 200 includes an offset function 201, a baseband modulator 205, and a transmitter section 250. The transmitter section 250 is coupled to the radio antenna 125 (FIG. 1). The offset function 201 and some aspects of the baseband modulator 205 and transmitter section 250 may comprise some functions performed by one or more processors executing programmed instructions that are stored in the device 100, while other functions may be circuits especially designed to perform a function, as is known in the art. The offset function 201 generates an offset frequency value that may be positive or negative at the plus output of the offset function 201 and is the inverse value at the minus output of the offset function 201. The baseband modulator 205 includes a subcarrier mapping function 210 that accepts a data input signal 206, which may comprise information in the form, for example, of parallel binary data words. The subcarrier mapping function 210 maps the data in the data input signal 206 into an information signal 211 that comprises a series of modulation symbols and has a transmission bandwidth 212 at baseband as shown in the spectral diagram associated with the information signal 211 by a dotted line. The bandwidth can be calculated from the characteristics of the data input signal 206 by Fourier transformation techniques well known in the art, using an energy cutoff to truncate the calculated spectrum to a finite bandwidth that is equivalent or approximately equivalent to that which will be transmitted after filtering. In certain embodiments, the transmission bandwidth 212 is less than a defined bandwidth of a channel in which the device transmits the information. This approach allows two or more transmitting devices to have the possibility of transmitting information simultaneously, when each device does not need all of the bandwidth of the channel and other criteria are met.

The information signal 211 is coupled to an Inverse Fast Fourier Transform function (IFFT) 215, which performs an Inverse Fast Fourier Transform to the information signal, resulting in a transformed signal called the configured information signal 216. The configured information signal 216 has the transmission bandwidth 212 of the information signal 211, but the energy that is within the transmission bandwidth is moved to a frequency range within the bandwidth of the channel 217 that is not centered at DC (zero Hertz), but offset from DC by a channel configuration offset 218. The resulting spectrum is shown in the spectral diagram associated with the configured information signal 216 by a dotted line, where it can be noted that the transmission bandwidth 212 (shown as cross-hatched) occurs entirely to the right of DC, at the upper end of the bandwidth of the channel 217. The configured information signal 216 is coupled to a cyclic prefix (CP) insert function 220, which replicates at the beginning of each symbol a small slice taken from the end of the symbol. This operation substantially maintains the same frequency spectrum that is within configured information signal 216. The resulting signal 221 is coupled to a digital mixer 225, which mixes the resulting signal 221 with a negated spurious mitigation offset 202 (−fOFFSET) generated by the offset function 201 when a spurious condition exists. When the spurious condition does not exist, the spurious mitigation offset 203 is set to zero. In some embodiments, the offset function 201 may determine the existence (or non-existence) of the spurious condition and the spurious mitigation offset 203 using a table that takes as inputs parameters that define at least the upper and lower bounds of the transmission bandwidth, and may include additional parameters. In other embodiments, the offset function may determine the existence (or non-existence) of the spurious condition and the spurious mitigation offset 203 by performing calculations using one or more formulas that take as inputs parameters that define the upper and lower bounds of the RF transmission bandwidth (the RF transmission frequency range) and additional parameters. This process of determining the existence of the spurious condition and determining the spurious mitigation offset is described in more detail below. It will be appreciated that in an alternative embodiment, the functions performed by the IFFT 215 and digital mixer 225 can be combined into a modified IFFT function that accomplishes the Inverse Fast Fourier Transformation and frequency offsetting. In this alternative embodiment, the CP function 220 is performed after the modified IFFT function.

It will also be appreciated that the digital mixer 225 could be replaced by an analog mixer, but some performance degradation would likely result.

The signal generated by the digital mixer 225 (or the signal produced by the CP function coupled to the modified IFF function in the alternative embodiment described above) is named the configured offset information signal 226, and comprises a signal having and in-phase component $v_I(t)$ and a quadrature signal $v_Q(t)$ at baseband, having a baseband spectrum shown by the spectral diagram that is associated with signal 226 by a dotted line when the spurious mitigation offset signal 203 is not zero. In this spectral diagram, the magnitude of the spurious mitigation offset 227 is the difference between the lower edge of the transmission bandwidth of the configured information signal 216 and the lower edge of the configured offset information signal 226. Both of these signals are shown as cross hatched. Each component of signal 226 is coupled to a respective one of two branches of quadrature transmitter 250. The branches are typical of quadrature transmitters, wherein each comprises a baseband filter 255, an amplifier 260, and a mixer 275.

The transmitter 250 further comprises a summing function 264, a local oscillator 265 and a quadrature generator 270. The frequency of the local oscillator may be generated using a phase lock loop (not shown in FIG. 2). The local oscillator 265 is coupled through the summing function 264 to an RF channel carrier frequency $f_{LO}$ 291 (also called the nominal transmit channel carrier frequency 291) which is typically at the center of the transmit channel bandwidth. The summing function 264 is also coupled to the spurious mitigation offset 203. The nominal RF channel carrier frequency $f_{LO}$ 291 and the spurious mitigation offset 203 are summed together by the summing function to form the net frequency generated by the local oscillator 265, which is $(f_{LO}+f_{OFFSET})$, and is named the offset local oscillator signal 266. The offset local oscillator signal 266 is combined with the configured offset information signal 226 by generating quadrature components 271, 272 of the offset local oscillator signal 266 and mixing them with the respective quadrature component of the configured offset information signal 226 in the mixers 275. The mixer output signals are then added and the resulting analog signal 278 is amplified in RF amplifiers 280 and filtered by RF filters 285 and coupled to antenna 125 for transmission. It will be appreciated that adding the negative spurious mitigation offset 202 in the modulator section 205 and adding the spurious mitigation offset 203 to the nominal RF channel carrier frequency $f_{LO}$ 291 results in a transmitted RF spectrum as shown in the spectral diagram associated with analog signal 278 by the dotted line. In this spectral diagram the transmitted spectrum is the same as the baseband spectrum associated with the configured information signal 216, but centered on the nominal transmit channel carrier frequency 291. It will be further appreciated that spurious signals generated by the mixer 265 are shifted by the spurious mitigation offset 203.

This unique technique in many cases mitigates spurious frequencies of a transmitted signal without having to reduce transmit power, by moving them away from receive frequency ranges of devices that may be attempting to receive desired signals in the receive frequency ranges. In cases when a transmitting device may use different transmission bandwidths and channel configuration offsets, this technique uses a spurious mitigation offset only when the offset is determined to be necessary. The determination of when the use of a spurious offset mitigation is necessary is made using such parameters as a particular transmission bandwidth, a particular channel configuration offset, and a particular receive frequency range of the transmitting device, and may also use a particular allowable spurious energy within the receive frequency range of another channel, and a particular transmit power being used by the transmitting device.

Referring to FIG. 3, a spectral diagram 300 of an RF channel 305 in a 3GPP system is shown, in accordance with some embodiments in which the device 100 is a communication device operating in Band 13 of an LTE 3GPP system. In this type of system, the Bands are made up of one or more RF channels, but Band 13 is a special case wherein the Band comprises only one channel. The device 100 (also referred to as a user equipment in 3GPP standards) is allocated a portion (RF transmission frequency range) of the Band by an identification of a sequence of resource blocks (RBs) that are allocated to a transmitting session (message), or portion thereof. Each resource block has a bandwidth which is the same, and which is approximately ⅟₅₀ of a channel width, each resource block being identified by an index from 0 to the quantity of RBs in the Band, minus 1, which in this case is 49. In FIG. 3, fewer than 50 resource blocks are shown for clarity. When a device 100 in such a system indicates that it is ready to transmit a message, the device 100 is allocated at least one set of sequential resource blocks by the fixed network according to, among other factors, a bandwidth deemed appropriate for the message type and a priority of the message. Since the quantity of allocated (active) resource blocks (which defines the transmission bandwidth 310) may be substantially less than all of the resource blocks, it will be appreciated that the active resource blocks may be judiciously allocated, and as a result other resource blocks may be allocated for simultaneous use by other devices. The set of sequential blocks in an LTE 3GPP system may be identified using an index of the first resource block and a quantity of blocks. These parameters, along with the Band identification, define the RF transmission frequency range, which can be specified by a low RF frequency 315 and a high RF frequency 320. The index of the lowest frequency RB and the quantity of sequential RBs provide the same information as a resource block range that is expressed as a low RB index and a high RB index. The total available bandwidth of the RBs within a Band is the transmission bandwidth configuration 325. The frequency range of the entire set of resource blocks in an RF channel is less that the bandwidth of the channel 310 by the bandwidth of guard bands at the upper and lower ends of the RF channel 305. The RF transmission frequency range can generally be defined for systems that are not LTE 3GPP by the transmission bandwidth 212 (FIG. 2), the channel configuration offset 218, and the nominal local oscillator transmit frequency. The allocated sequence of resource blocks to a particular device 100 may change over time during one communication session. This is explained in more detail below.

It will be appreciated that when a device is allocated a small number of blocks and a large transmit power, the energy density of the transmission will be larger than for a larger number of blocks at the same transmit power. It will further be appreciated that spurious energy transmissions (spurs) are generated by the non-linear process of mixing. In general, spurs known as counter intermodulation (CIM) spurs are generated at a frequency of $f_{LO}-3f_M$, where $f_{LO}$ is the nominal transmit channel carrier frequency 291 (FIG. 2) and $f_M$ is a modulating frequency at baseband. Other IM spurs, referred to herein as image induced intermodulation (IIIM) spurs are generated at a frequency of $f_{LO}+3f_M$. The modulating signal $f_M$ will actually have a frequency range that is determined by the transmission bandwidth 212 (FIG. 2) and channel configuration offset 218 (FIG. 2).

As an example of embodiments used for Band 13 of LTE 3GPP, $f_{LO}$ is 782 MHz. FIG. 4 shows a table 400 of the upper and lower frequency limits of each resource block, and the associated CIM and image spurious frequencies for Band 13 when no spurious mitigation offset is used for the device 100, in accordance with some LTE 3GPP embodiments. The columns of table 400 are, from left to right, are: resource block index, $f_M$ lower edge (MHz), $f_M$ upper edge (MHz), counter-intermodulation (CIM) lower edge (MHz), counter-intermodulation (CIM) upper edge (MHz), IIIM lower edge (MHz), and IIIM upper edge (MHz). It can be seen in the table, for example that sequential blocks 40-44 have a lower frequency of 2.7 MHz and an upper frequency of 3.6 MHz at baseband. Accordingly, the lowest counter intermodulation spur frequency generated by these resource blocks is at (782−3*3.6) MHz, or 771.2 MHz and the highest counter intermodulation spur frequency is at (782−3*2.7) MHz, or 773.9 MHz. There exists a public safety band that has a receive frequency range of 769-775 MHz. It will be appreciated, therefore, that the counter intermodulation spurs for this set of resource blocks are at frequencies that are within this public safety band. All of the CIM frequencies that are within the public safety receive frequency range that are generated at any of the RBs 0-49 are shown in bold in FIG. 4.

The public safety band has stringent requirements on the amount of spurious energy that is allowed to be generated within this receive band, and the specifications for LTE 3GPP Band 13, resource blocks 43-49, do not allow devices to reduce their transmit power as much as is permitted for other resource block ranges, when small resource block ranges are used. This restriction limits the amount of spurious mitigation that can be achieved by transmit power reduction in the RB range 43-49. In a simplified approach that does not take into consideration whether the energy density of the CIM spurs transmitted by an LTE 3GPP device exceeds the stringent interference requirements of the public safety band, a spurious mitigation offset 203 (FIG. 2) of +1.7 MHz is coupled to the summing function 264 when LTE 3GPP Band 13 is used for transmission, resulting in an offset local oscillator signal 266 having a frequency of 783.7 MHz. A negated spurious mitigation offset 202 (FIG. 2) of −1.7 MHz is coupled to the digital mixer 225, which generates a configured offset information signal 226 having a 1.7 MHz spurious mitigation offset subtracted from the modulated frequency, $f_M$. The RF transmission frequency range of the spurs generated by resource blocks 37-49 when using this spurious mitigation offset is shifted to 782.32–775.30 MHz, which is outside the public safety band of 769–775 MHz. This can be seen by observing the CIM frequencies for resource blocks 37-49 in FIG. 5, which shows a table 500 of the frequencies that the CIM and IIIM interferences would have for the resource blocks of LTE 3GPP Band 13 if a +1.7 MHz spurious mitigation offset 203 were used for all of them. The columns of table 500 are, from left to right: resource block index, $f_M-f_{OFFSET}$ lower edge (MHz), $f_M-f_{OFFSET}$ upper edge (MHz), counter-intermodulation (CIM) lower edge (MHz), counter-intermodulation (CIM) upper edge (MHz), IIIM lower edge (MHz), and IIIM upper edge (MHz).

It will be appreciated that the offset used for the resource blocks in FIG. 5 removes the CIM spurs of resource blocks generated by RB range 37-49 from a first portion of the public safety band but introduces IIIM spurs generated by RB range 7-18 into a second portion of the public safety range. This is acceptable because, for transmissions using small ranges of resource blocks (e.g., one to three) in the RB range 7-18, the transmission power of the interfering device 100 is allowed to be lowered substantially more than in the RB range 37-49. Because of the greater power reduction allowances for the low RB range of the Band 13, a fixed offset as used for FIG. 5 can be imposed along with a power reduction for any transmissions in LTE 3GPP Band 13 to sufficiently mitigate the spurs generated by information transmissions using Band 13.

Tables 400 and 500 are just an example of how spurs are mitigated for Band 13 of the LTE 3GPP system. It will be appreciated that in general, for all LTE 3GPP Bands, or in other radio communication systems, a table or multiple tables can be constructed that accept as an input the RF transmission frequency range and generate as an output one or more spurious mitigation offsets, each offset being for a portion of the RF transmission frequency range, wherein the offsets spurs for a particular receive frequency range for devices operating in another communication system. The spurs that are considered (i.e., those listed in the table or tables) need not be constrained to CIM and IIIM spurs, but may include any types of spurs that are calculated to or suspected of having energies above allowed limits for other communication systems. The table or tables could be replaced by a formula or formulas that depend upon the RF transmission frequency ranges.

It should be noted that when making the selection of a spurious mitigation offset, further consideration should take into account the band or channel to which the CIM and image spurs are shifted when a candidate spurious mitigation offset is assessed, so that the spurs do not exceed allowable levels of the band to which they are shifted. The spurious mitigation offset values are typically determined by human analysis of the spurs that would be generated without using a spurious mitigation offset at the time of system design, using consideration of the acceptable spurious energy limits for receive channels that the spurs would affect and the implications of the received frequency affected by the spurs that are moved to by using the offsets, and their acceptable spurious energy limits. Thus, the spurious mitigation offsets are predetermined with reference to an allocation that is being made by a network device for a device 100 that is preparing to transmit information.

In order to reduce the circumstances in which a spurious condition is determined to occur, the spectral density and frequency range of the spurs that are transmitted can be compared to allowable energy levels at the frequencies at which they occur, at some specified distance from the transmitting device. The spectral density will of course be reduced when the transmit power is reduced (for a particular transmit bandwidth), and will be increased when the transmit bandwidth is reduced (for a particular transmit power). For example, the spurious condition may be determined to exist irrespective of the allocated transmit power level when the transmit bandwidth allocated for the current information signal (message) ($BW_{CURRENT}$) is less than a predetermined threshold transmit bandwidth ($BW_{THRESHOLD}$). At these allocated transmit bandwidths, the spurious energy levels in the affected receive band are assumed to be above an allowable level for all allocatable transmit power levels, and the spurious condition is therefore determined to exist. When the transmit bandwidth is equal to or greater than $BW_{THRESHOLD}$, then the spurious condition is determined to exist only when the allocated transmit power is greater than 23 dbm−10 log($BW_{THRESHOLD}/BW_{CURRENT}$).

In certain embodiments for an LTE 3GPP system, the spurious condition is determined to exist (expressed below as "Counter-IM avoidance is enabled") when:

i. The network signals an AdditionalSpectrumEmission value (1.32) in SystemInformationBlockType2 or MobilityControlInfo corresponding to an NS_#. For Band 13, Counter-IM avoidance would be needed only when NS_#=NS__07. In addition to the NS_# criteria, a ALWAYS_OFF and an ALWAYS_ON mode are needed to always operate in normal mode or Counter-IM avoidance mode respectively (regardless of the RB allocation and Pout criteria below). A programmable COUNTER-IM_MODE element should be implemented for each RF band. The definition and possible values for COUNTER-IM_MODE are:

| COUNTER-IM_MODE[2:0] | Defines the top level use cases when Counter-IM avoidance will be turned on<br>0b000: ALWAYS OFF—always in normal operating mode (ignores RB allocation and Pout criteria)<br>0b001: ALWAYS ON—always in Counter-IM avoidance mode (ignores RB allocation and Pout criteria)<br>0b010: NS__07—Counter-IM avoidance mode will be turned on when the network signals NS__07 and the RB allocation and Pout criteria are met<br>0b011-0b111—Reserved |
|---|---| ii. The number of allocated RB's (L_CRB) plus the RB_start is greater than a low threshold and less than or equal to a high threshold. The thresholds should be programmable for each RF band. Counter-IM avoidance should be enabled when:
(RB_start+L_CRB)>CIM_LOW_Threshold
AND
(RB_start+L_CRB)≤CIM_HIGH_Threshold
The definition of CIM_LOW_Threshold and CIM_HIGH_Threshold are:

| CIM_LOW_Threshold[6:0] | Defines the lower threshold for allocated RB location that Counter-IM avoidance will be used. Counter-IM avoidance mode should be turned on whenever:<br>(RB_start + L_CRB) > CIM_LOW_Threhsold<br>Possible values are 0 to 99 |
|---|---|
| CIM_HIGH_Threshold[6:0] | Defines the upper threshold for allocated RB location that Counter-IM avoidance will be used. Counter-IM avoidance mode should be turned on whenever:<br>(RB_start + L_CRB) ≤ CIM_HIGH_Threhsold<br>Possible values are 1 to 100 | iii. The number of allocated RB's (L_CRB) is below a threshold (CIM_L_CRB_Threshold). The CIM_L_CRB_Threshold value should be programmable for each RF band. Counter-IM avoidance mode should be enabled when:
L_CRB<CIM_L_CRB_Threshold The definition of CIM_L_CRB_Threshold is:

| | |
|---|---|
| CIM_L_CRB_Threshold[6:0] | Defines the maximum number of allocated RB's that Counter-IM avoidance will be used. Counter-IM avoidance mode should be turned on whenever:<br>L_CRB < CIM_L_CRB_Threhsold<br>Possible values are 0 to 99 | iv. The output power (Pout) is above a threshold (CIM_Pout_Threshold). This Pout threshold is dependent on the number of allocated RB's (L_CRB). The threshold can be calculated according to:
$CIM_{Pout}$_Threshold=23 dbm−10 log(CIM_L_CRB_Threshold/L_CRB) A look-up table (LUT) should be implemented to avoid the need to calculate the log for CIM_Pout_Threshold. The table should be part programmable and allow the CIM_Pout_Threshold to be specified for different numbers of allocated RB's (L_CRB). The table should allow up to 8 entries as shown below. CIM_L_CRB[x] values in the table that equal 0 should be ignored. The CIM_Pout_Threshold[n] value should be used until the number of allocated RB's (L_CRB) has reached the CIM_L_CRB[n+1] value (for example, if CIM_L_CRB[0]=1 and CIM_L_CRB[1]=5, if the number of allocated RB's is 4, the CIM_Pout_Threshold[0] value should be used). The final value in the table should apply until CIM_L_CRB_Threshold is reached. The CIM_L_CRB[n] values are unsigned integers ranging from 0 to 99; the CIM_Pout_Threshold values are signed integers ranging from −50 to +23 and represent the Pout threshold in dBm.

| | |
|---|---|
| CIM_L_CRB[0] | CIM_Pout_Threshold[0] |
| CIM_L_CRB[1] | CIM_Pout_Threshold[1] |
| CIM_L_CRB[2] | CIM_Pout_Threshold[2] |
| CIM_L_CRB[3] | CIM_Pout_Threshold[3] |
| CIM_L_CRB[4] | CIM_Pout_Threshold[4] |
| CIM_L_CRB[5] | CIM_Pout_Threshold[5] |
| CIM_L_CRB[6] | CIM_Pout_Threshold[6] |
| CIM_L_CRB[7] | CIM_Pout_Threshold[7] |

Figure 6:
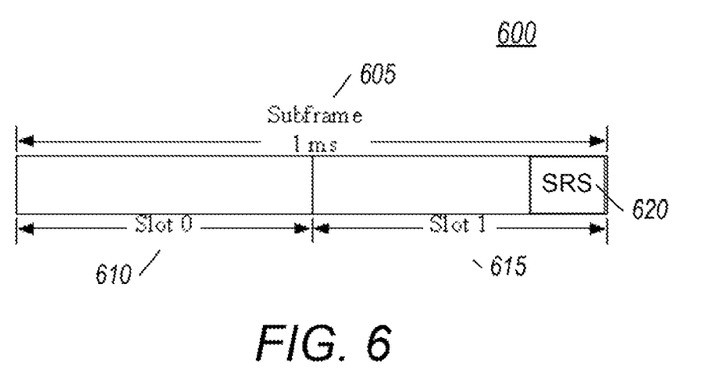
FIG. 6 is a timing diagram of an LTE 3GPP sub-frame 605, in accordance with some embodiments.

In come embodiments, the device 100 may use a transmission protocol for which two or more RF transmission frequency ranges are used sequentially and repetitively. An example of this type of transmission protocol is shown in FIG. 6, which shows a timing diagram 600 of an LTE 3GPP sub-frame 605, which has a duration of 1 millisecond. In some instances, a sub-frame may comprise a first slot 610, Slot 0 and a second slot 615, Slot 1, for which different resource block ranges are used, and therefore for which different spurious mitigation offsets may be used. A portion of the Slot 1 may be further used for a function known as the Sounding Reference Symbol (SRS) 620, which may comprise yet another resource block range. Thus, different spurious mitigation offsets may be needed for one or more of three portions of each sub-frame in LTE 3GPP. A local oscillator of state of the art conventional design may not be able to stabilize at a new frequency quickly enough to avoid excessive distortion at the beginning of a transmitted signal that has a new spurious mitigation offset. In accordance with some embodiments, a local oscillator tuning state is stored in association with each configured offset information signal. The appropriate stored local oscillator tuning state is then used to tune the local oscillator 265 to a new RF transmit frequency determined by a new spurious mitigation offset when a change of spurious mitigation offsets occurs between the sequential transmissions. This approach is usable in embodiments other than LTE 3GPP that allocate different RF transmission frequency ranges (associated with different configured offset information signals) sequentially and repetitively during one substantially continuous RF transmission by a device.

A situation also related to a transmission protocol for which two or more RF transmission frequency ranges are used sequentially and repetitively is that when the RF frequency is changed due to a change in the spurious mitigation offset, the retuning using could result in a phase discontinuity, which would also cause excessive distortion at the beginning of a transmitted signal that has a new spurious mitigation offset. This may be avoided by using a state of the art local oscillator circuit and storing the local oscillator divider state for each spurious mitigation offset that is used. The stored divider state is then used along with the stored tuning state (as described above), when a change of spurious mitigation offsets occurs between the sequential transmissions. This reduces such phase distortion to an acceptable level. This approach is usable in embodiments other than LTE 3GPP that allocate different RF transmission frequency ranges associated with different configured offset information signals sequentially and repetitively during one substantially continuous RF transmission by a device.

As indicated above, there are instance other than 3GPP Band 13 interfering with US public safety bands that will benefit from embodiments described herein. In some embodiments, the 3GPP Band 7 user equipment (UE) transmit band is 2500 MHz to 2570 MHz, while 3GPP Band 38 is defined as a time division duplex (TDD) band from 2570 MHz to 2620 MHz. Since Band 38 is TDD, UE's employing this Band may either transmit or receive in Band 38 frequencies. The Band 7 spurious outputs may interfere with Band 38 receivers in close proximity. One example to illustrate the problem is $f_{LO}$=2560 MHz, and a single resource block deployed at the lower edge of a 20 MHz LTE channel. In this case the lower edge of $f_M$=−9 MHz and the upper edge of $f_M$=−8.82 MHz. The Counter IM at $f_{LO}$−3$f_M$ extends from 2586.46 MHz to 2587 MHz and can interfere with Band 38 UE receivers. In these embodiments, $f_{LO}$ is offset −4.25 MHz and $f_M$ is offset +4.25 MHz for $f_{LO}$+$f_{OFFSET}$=2555.75 MHz, lower edge of $f_M$−$f_{OFFSET}$=−4.75 MHz and the upper edge of $f_M$−$f_{OFFSET}$=−4.57 MHz. The Counter IM frequencies will then extend from 2569.46 MHz to 2570 MHz and will not fall within Band 38. This type of analysis can be applied to other UE $f_{LO}$ frequencies in 3GPP Band 7 and allocated block ranges to determine and mitigate spurious interference between 3GPP Band 7 and Band 38. The results can then be stored as tables or formulas and the spurious mitigation offsets can be used to mitigate spurious interferences.

In other embodiments, UE transmissions in 3GPP Band 7 at frequencies of 2500 MHz to 2570 MHz can interfere with Wi-Fi and Bluetooth receivers operating at frequencies from 2401 MHz to 2495 MHz. One example to illustrate the problem is UE $f_{LO}$=2510 MHz, and a single resource block deployed at the upper edge of a 20 MHz LTE channel. In this case the lower edge of $f_M$=8.82 MHz and the upper edge of $f_M$=9 MHz. The Counter IM at $f_{LO}$−3$f_M$ extends from 2483 MHz to 2483.54 MHz and can interfere with Wi-Fi and Bluetooth receivers. In these embodiments $f_{LO}$ is offset +3 MHz and $f_M$ is offset −3 MHz for $f_{LO}$+$f_{OFFSET}$=2513 MHz, lower edge of $f_M$−$f_{OFFSET}$=5.82 MHz and the upper edge of $f_M$–$f_{OFFSET}$=6 MHz. The Counter IM frequencies will then extend from 2495 MHz to 2495.54 MHz and will not fall within the Wi-Fi or Bluetooth bands. This type of analysis can be applied to other UE $f_{LO}$ frequencies in 3GPP Band 7 and allocated block ranges to determine and mitigate spurious interference between 3GPP Band 7 and Wi-Fi and Bluetooth receivers. The results can then be stored as tables or formulas and the spurious mitigation offsets can be used to mitigate spurious interferences.

Figure 7:
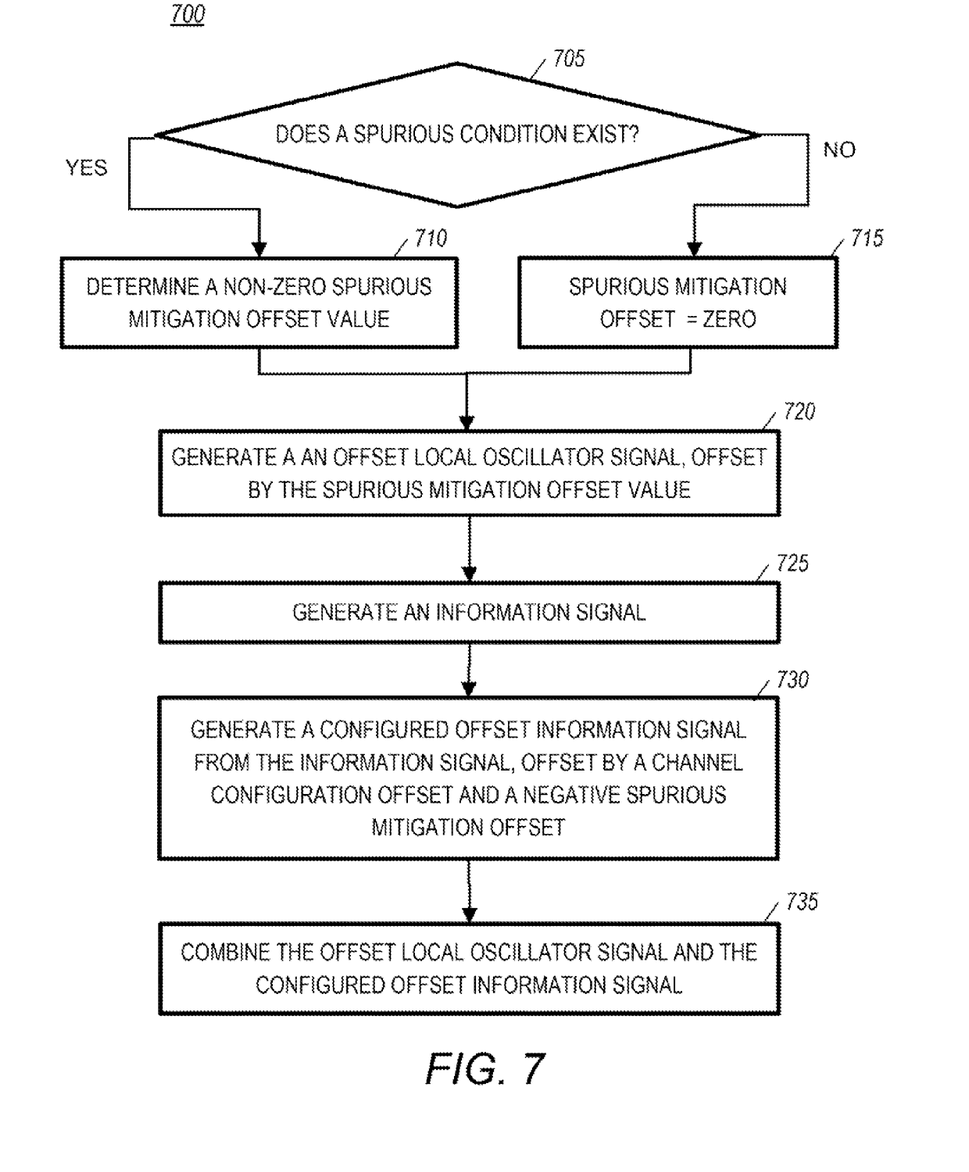
FIGS. 7-11 are flow charts that show some steps of a method for mitigating spurious conditions, in accordance with certain embodiments.

Referring to FIG. 7, a flow chart 700 shows some steps of a method for mitigating spurious conditions, in accordance with certain embodiments. At step 705, a determination is made as to whether a spurious condition exists. This may be performed, for example, by comparing an allocated transmit bandwidth to a predetermined bandwidth, or by using a formula, as described herein above. When a spurious condition exists, a non-zero spurious mitigation offset is determined at step 710. This may be a predetermined value obtained from a table, as described herein above. When a spurious condition does not exist, the spurious mitigation offset is zero at step 715. This may also be determined from a table. At step 720 an offset local oscillator signal is generated that is at a frequency that is offset from a nominal transmit channel carrier frequency by the spurious mitigation offset determined in one of steps 710 or 715. At step 725 an information signal is generated that comprises a series of modulation symbols and having a transmission bandwidth at baseband. A configured offset information signal is generated from the information signal at step 730, wherein the spectrum of the configured offset information signal is offset from DC by a channel configuration offset, and is further offset by a negative of the spurious mitigation offset. At step 735 the offset local oscillator signal and the configured offset information signal are combined using a mixing technique.

It will be appreciated that in accordance with some other embodiments, the above may be performed in different order or may be expressed differently but achieve the same results. For example, steps 725 and 730 could be performed before step 720. Furthermore, steps 705-715 may be eliminated and expressed as a characteristic, in the following manner: the spurious mitigation offset is zero when a spurious condition does not exist and is non-zero when the spurious condition does exist.

Figure 8:
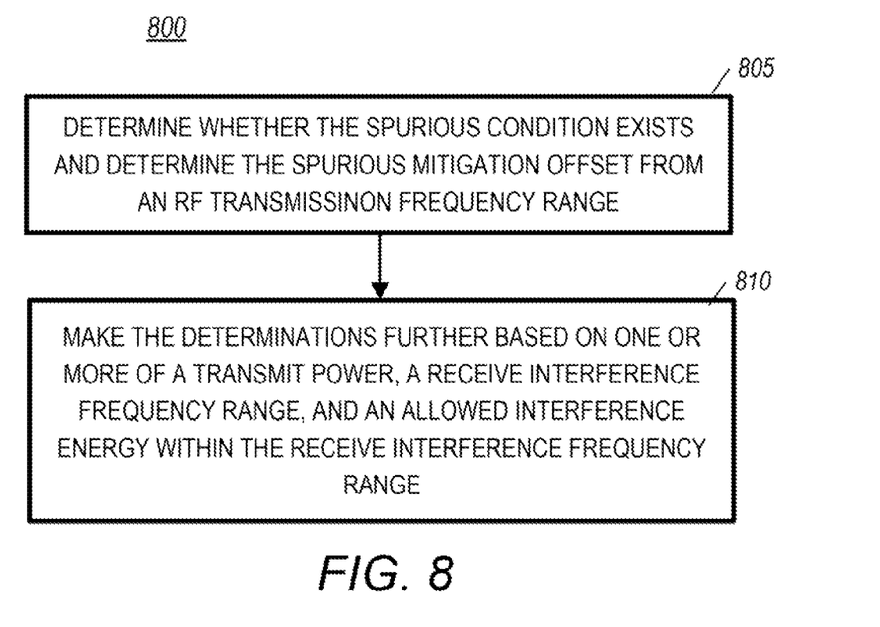

Referring to FIG. 8, a flow chart 800 shows some steps of mitigating spurious conditions, in accordance with certain embodiments. Steps 705-715 of FIG. 7, or alternatively the characteristic that "the spurious mitigation offset is zero when a spurious condition does not exist and is non-zero when the spurious condition does exist", require determining whether the spurious condition exists and determining the spurious mitigation offset when the spurious condition does exist. This may be accomplished by using an RF transmission frequency range in step 805. Sets of parameters that provide the same information as the RF transmission frequency range are the sets comprising (the transmission bandwidth, the channel configuration offset, and the nominal local oscillator transmit frequency) and (a band identity and a resource block range). Other equivalent sets of parameters may exist for other systems that provide the RF transmission frequency range. The determinations may be further dependent upon one or more of a transmit power, a receive interference frequency range, and an allowed interference energy within receive interference frequency range. As noted above, the determinations may be made from a table or tables, or they could be made using formulas dependent upon the parameters in steps 805 and 810.

Figure 9:
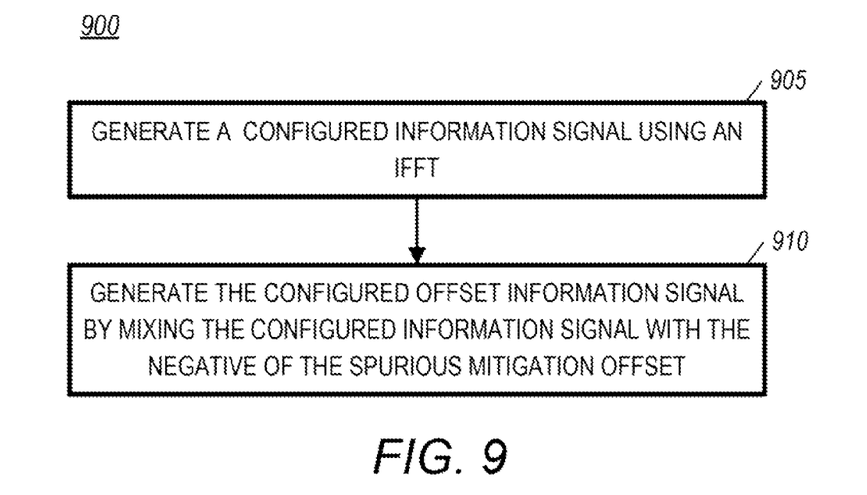

Referring to FIG. 9, a flow chart 900 shows some steps of mitigating spurious conditions, in accordance with certain embodiments. The steps 905 and 910 are an embodiment of step 730 of flow chart 700 of FIG. 7. At step 905, a configured information signal 216 (FIG. 2) is generated using an Inverse Fast Fourier Transformation of the information signal 211. At step 910, the configured offset information signal 226 is generated by mixing the configured information signal 216 (which may have been augmented by a cyclic prefix as described above with reference to FIG. 2) with the negated spurious mitigation offset 202.

Figure 10:
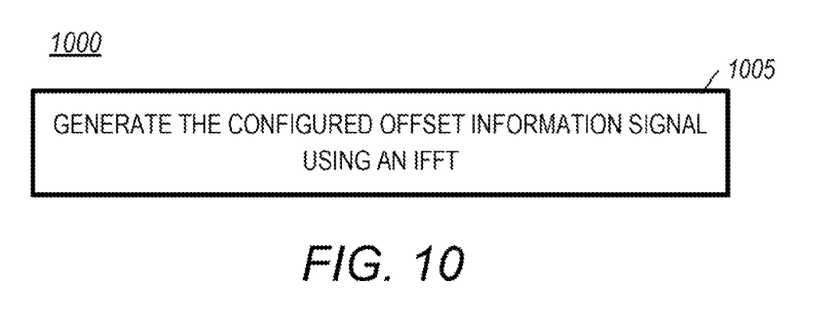

Referring to FIG. 10, a flow chart 1000 shows one step of mitigating spurious conditions, in accordance with certain embodiments. The step 1005 is an embodiment of step 730 of flow chart 700 of FIG. 7. At step 1005, the configured offset information signal 226 (FIG. 2) is generated using an Inverse Fast Fourier Transformation. That is, the IFFT directly generates the configured offset information signal 226 without using a separate mixer function.

Figure 11:
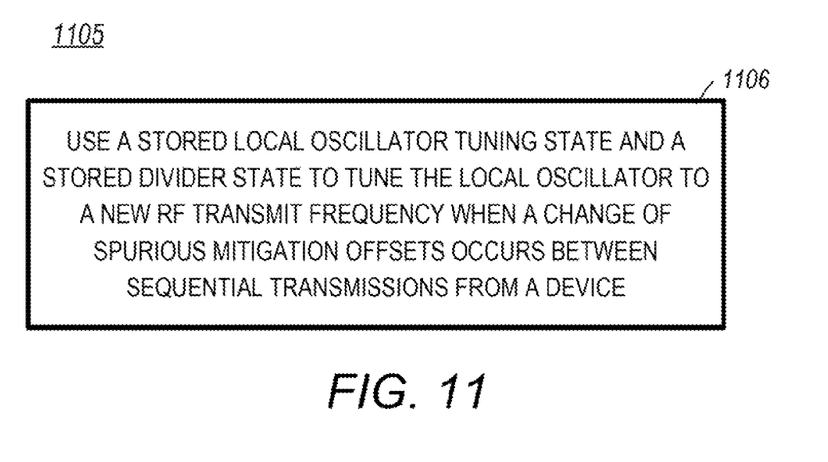

Referring to FIG. 11, a flow chart 1105 shows one step of mitigating spurious conditions, in accordance with certain embodiments. In these embodiments, two or more different configured offset information signals are transmitted sequentially and repetitively by a device, wherein one of the configured offset information signals has a spurious mitigation offset that is different than at least one other of the other configured offset information signals. A stored local oscillator tuning state and a stored divider state is used at step 1106 to tune the local oscillator frequency to a new RF transmit frequency determined by a new spurious mitigation offset when a change of spurious mitigation offsets occurs between the sequential transmissions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (the "processing system") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

While the principles of the invention have been described above in connection with specific apparatus, it is to be clearly understood that this description is made only by way of example and not as a limitation on the scope of the invention. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   generating an offset local oscillator signal that is at a frequency that is offset from a nominal transmit channel carrier frequency by a spurious mitigation offset;
   generating an information signal comprising a series of modulation symbols and having a transmission bandwidth at baseband;
   generating a configured offset information signal from the information signal, wherein the spectrum of the configured offset information signal is offset from DC by a channel configuration offset, and is further offset by a negative of the spurious mitigation offset; and
   combining the offset local oscillator signal and the configured offset information signal using a mixing technique, wherein the spurious mitigation offset is zero when a spurious condition does not exist and is non-zero when the spurious condition does exist.

2. The method according to claim 1, further comprising:
   determining whether the spurious condition exists and determining the spurious mitigation offset from an RF transmission frequency range.

3. The method according to claim 2, wherein the determinations are made using a table.

4. The method according to claim 2, wherein determining whether the spurious condition exists and determining the spurious mitigation offset is further dependent upon one or more of a transmit power, a receive interference frequency range, and an allowed interference energy within receive interference frequency range.

5. The method according to claim 4, wherein the determinations are made using a table.

6. The method according to claim 1, wherein the step of generating a configured offset information signal from the information signal comprises:
   generating a configured information signal using an Inverse Fast Fourier Transformation of the information signal; and
   generating the configured offset information signal by mixing the configured information signal with the negative of the spurious mitigation offset.

7. The method according to claim 1, wherein the step of generating a configured offset information signal from the information signal comprises:
   generating the configured offset information signal using an Inverse Fast Fourier Transformation.

8. The method according to claim 1, wherein two or more different configured offset information signals are transmitted sequentially and repetitively by a device, and wherein at least one of the configured offset information signals has a spurious mitigation offset that is different than at least one other of the other configured offset information signals, further comprising the step of using a stored local oscillator tuning state and a stored local oscillator divider state to tune the local oscillator frequency to a new RF transmit frequency determined by a new spurious mitigation offset when a change of spurious mitigation offsets occurs between the sequential transmissions.

9. A non-transitory, tangible computer-readable storage medium having computer readable code stored thereon for programming a computer to:
   generate an offset local oscillator signal that is at a frequency that is offset from a nominal transmit channel carrier frequency by a spurious mitigation offset;
   generate an information signal comprising a series of modulation symbols and having a transmission bandwidth at baseband;
   generate a configured offset information signal from the information signal, wherein the spectrum of the configured offset information signal is offset from DC by a channel configuration offset, and is further offset by a negative of the spurious mitigation offset; and
   combine the offset local oscillator signal and the configured offset information signal using a mixing technique, wherein the spurious mitigation offset is zero when a spurious condition does not exist and is non-zero when the spurious condition does exist.

10. The non-transitory, tangible computer-readable storage medium according to claim 9, wherein the computer readable code stored thereon further programs the computer to:
   determine whether the spurious condition exists and determining the spurious mitigation offset from an RF transmission frequency range.

11. The non-transitory, tangible computer-readable storage medium according to claim 10, wherein the computer readable code that programs the computer to determine whether the spurious condition exists and determine the spurious mitigation offset further programs the computer to make the determinations dependent upon one or more of a transmit power, a receive interference frequency range, and an allowed interference energy within receive interference frequency range.

12. The non-transitory, tangible computer-readable storage medium according to claim 9, wherein the computer readable code that programs the computer to generate the configured offset information signal from the information signal further programs the computer to:
   generate a configured information signal using an Inverse Fast Fourier Transformation of the information signal; and
   generate the configured offset information signal by mixing the configured information signal with the negative of the spurious mitigation offset.

13. The non-transitory, tangible computer-readable storage medium according to claim 9, wherein the computer readable code that programs the computer to generate a configured offset information signal from the information signal further programs the computer to:
   generate the configured offset information signal using an Inverse Fast Fourier Transformation.

14. The non-transitory, tangible computer-readable storage medium according to claim 9, wherein two or more different configured offset information signals are transmitted sequentially and repetitively by a device, and wherein at least one of the configured offset information signals has a spurious mitigation offset that is different than at least one other of the other configured offset information signals, and wherein the computer readable code further programs the computer to:
   use a stored local oscillator tuning state and a stored local oscillator divider state to tune the local oscillator frequency to a new RF transmit frequency determined by a new spurious mitigation offset when a change of spurious mitigation offsets occurs between the sequential transmissions.

15. An apparatus comprising:
   a local oscillator that generates an offset local oscillator signal that is at a frequency that is offset from a nominal transmit channel carrier frequency by a spurious mitigation offset;
   a processor that executes programmed instructions that generate an information signal comprising a series of modulation symbols and having a transmission bandwidth at baseband;
   a baseband modulator that generates a configured offset information signal from the information signal, wherein the spectrum of the configured offset information signal is offset from DC by a channel configuration offset, and is further offset by a negative of the spurious mitigation offset; and
   a transmitter section that combines the offset local oscillator signal and the configured offset information signal using a mixing technique,
   wherein the spurious mitigation offset is zero when a spurious condition does not exist and is non-zero when the spurious condition does exist.

16. The apparatus according to claim 15, wherein the processor:
   determines whether the spurious condition exists and determines the spurious mitigation offset from an RF transmission frequency range.

17. The apparatus according to claim 16, wherein the processor determines whether the spurious condition exists and determines the spurious mitigation offset and the determinations are dependent upon one or more of a transmit power, a receive interference frequency range, and an allowed interference energy within receive interference frequency range.

18. The apparatus according to claim 15, wherein the configured offset information signal is generated by the baseband modulator from the information signal by:
   generating a configured information signal using an Inverse Fast Fourier Transformation of the information signal; and
   generating the configured offset information signal by mixing the configured information signal with the negative of the spurious mitigation offset.

19. The apparatus according to claim 15, wherein the configured offset information signal is generated by the baseband modulator from the information signal by:
   generating the configured offset information signal using an Inverse Fast Fourier Transformation.

20. The apparatus according to claim 15, wherein two or more different configured offset information signals are transmitted sequentially and repetitively by a device, and wherein at least one of the configured offset information signals has a spurious mitigation offset that is different than at least one other of the other configured offset information signals, and wherein the transmitter section stores a local oscillator tuning state and a stored local oscillator divider state that are used to tune the local oscillator frequency to a new RF transmit frequency determined by a new spurious mitigation offset when a change of spurious mitigation offsets occurs between the sequential transmissions.

* * * * *